United States Patent [19]

Wieland et al.

[11] Patent Number: 4,735,140
[45] Date of Patent: Apr. 5, 1988

[54] COUPLING FOR A SHEET FED ROTARY PRINTING MACHINE

[75] Inventors: Erich G. Wieland; Wolfgang C. J. Spiess, both of Würzburg, Fed. Rep. of Germany

[73] Assignee: Koenig & Bauer Aktiengesellschaft, Fed. Rep. of Germany

[21] Appl. No.: 903,529

[22] Filed: Sep. 4, 1986

[30] Foreign Application Priority Data

Sep. 27, 1985 [DE] Fed. Rep. of Germany ....... 3534488

[51] Int. Cl.⁴ ..................... B41F 21/10; B41F 13/12
[52] U.S. Cl. ................................. 101/230; 101/248; 192/91 A
[58] Field of Search ............... 101/248, 230; 192/70.3, 192/70.29, 91 A

[56] References Cited

U.S. PATENT DOCUMENTS 3,687,253 8/1972 Bjorklund ..................... 192/91 A
4,102,446 7/1978 Rist ................................. 192/91 A
4,444,106 4/1984 Frenzel et al. ................. 101/230 X Primary Examiner—Clifford D. Crowderl
Attorney, Agent, or Firm—Jones, Tullar & Cooper

[57] ABSTRACT

A coupling for a sheet fed rotary printing machine utilizes a sheet transfer drum having a pair of interfitting toothed drive wheels. The two toothed drive wheels are joined to each other by a friction fit that is applied through a plurality of elongated cylinder screws. These screws are tensioned by a group of radially extending, pivotably mounted actuating levers. A pneumatic cylinder and piston rod assembly is used to release the tensioning force applied to the cylinder screws to thus allow the two toothed wheels and hence the sheet transport component of the sheet transfer drum to which they are attached by be rotated relative to one another. Such relative rotation is accomplished by locking one printing couple and driving the other.

2 Claims, 2 Drawing Sheets

COUPLING FOR A SHEET FED ROTARY PRINTING MACHINE

FIELD OF THE INVENTION

The present invention is directed generally to a coupling for a sheet fed rotary printing machine. More particularly the present invention is directed to a coupling between two toothed wheel trains of a sheet fed rotary printing machine. Most specifically, the present invention is directed to a coupling between two toothed wheel trains of a sheet fed rotary printing machine for recto and verso printing. The coupling comprises a releasable friction fit connection between two toothed wheels which are coaxial to each other and which are carried on a sheet transfer drum assembly. A first of these two toothed wheels cooperates with one printing couple and the second toothed wheel cooperates with a second printing couple in the sheet fed rotary printing machine. When the coupling of the present invention is released, the positions of gripper elements and holding bars on the sheet transfer drum can be varied by holding one of the printing couples stationary while driving the other a desired amount.

DESCRIPTION OF THE PRIOR ART

Sheet fed rotary printing machines which are capable of being switched from recto to verso printing and which are adjustable for various sizes of sheets being printed are generally known in the art. In such situations a transfer drum is typically interposed between adjacent printing couples and it is therefore necessary to adjust the positions of the various sheet transfer components, such as gripper fingers, on the periphery of the sheet transfer drum. U.S. Pat. No. 4,457,231 to Kawaguchi is exemplary of a prior art device for adjusting the phase or spacing of a transfer drum in a sheet fed rotary printing machine. In devices of this general type, a toothed wheel carries a toothed ring. The toothed ring is urged axially onto the toothed wheel through the use of clamping plates. These plates are, in turn, urged on one side of the toothed ring by either springs or two-armed levers that act on bolts which are connected to the clamping plates. A central screw, that is equipped with a collar, is loosened to detach the clamping plates from the flank of the toothed ring. The toothed ring, which meshes with a toothed wheel of a first inking unit, is turned to accomplish the desired phase or spacing adjustment. Once the adjustment has been made, the central screw is screwed back in to again urge the toothed ring to the toothed wheel by use of the clamping plates.

In manually adjustable devices of this general type a tool or tools must be used to detach and re-secure the toothed ring during re-positioning of the various sheet transport mechanisms carried by the sheet transfer drum. Furthermore, the central adjustment screw must be kept under tension during operation of the printing machine. It is always possible that the screw may weaken or break over time due to metal fatigue, various stresses, or the like. Thus as the printing machine continues to operate, there is an increasing possibility that the proper orientation of the various sheet transport devices of the sheet transfer drum will be compromised. This results in a loss of tight, accurate registry during sheet transfer as one or more of the sheet transport mechanisms may become misaligned. A further possible problem with assemblies which utilize a central locking screw is one of possible mis-threading of the locking screw in the drive shaft of the sheet transfer drum. Should such a problem arise, the required repair work would be quite time consuming and would result in substantial machine down time and a significant loss of production.

It will thus be apparent that there is a need for a coupling between printing couples in a sheet fed rotary printing machine which overcomes the limitations of the various prior art solutions and which is positive in operation as well as being reliable and durable. The coupling for a sheet fed rotary printing machine in accordance with the present invention provides such a device.

SUMMARY OF THE INVENTION

It is an object of the present invention to provide a coupling for a sheet fed rotary printing machine.

Another object of the invention is to provide a coupling between two toothed wheel trains of a sheet fed rotary printing machine.

A further object of the present invention is to provide a coupling between two toothed wheel trains of a sheet fed rotary printing machine for recto and verso printing.

Still another object of the present invention is to provide a coupling having a releaseable friction connection between two toothed wheels.

Yet a further object of the present invention is to provide a coupling having two coaxial toothed wheels carried by a sheet transfer drum.

Even still another object of the present invention is to provide a coupling whose clamping and unclamping force is applied by a plurality of pivotable lever arms.

Yet still a further object of the present invention is to provide a coupling which is remotely operable.

As will be discussed in greater detail in the description of the preferred embodiment which is set forth subsequently, the coupling for a sheet fed rotary printing machine in accordance with the present invention includes two coaxial toothed wheels carried by a sheet transfer drum. The two toothed wheels are normally clamped or held together by a releaseable friction fit connection. When it is desired to change relative position of selected ones of the sheet transport assemblies carried on the periphery of the sheet transfer drum, the two toothed wheels are unclamped from each other. One can then be moved relatively with respect to the other thereby changing sheet transport assembly positions. Disconnection of the two toothed wheels is accomplished through the use of a pneumatic piston and cylinder which moves a guide body that carries first ends of pivotable levers. The second ends of these levers indirectly release the two toothed wheels from their close contact so that one may be moved with respect to the other.

One particular advantage of the present coupling for a sheet fed rotary printing machine in accordance with the present invention is that the coupling may be detached without actuating the connecting machine elements. The coupling is quite simple and is quick and easy to operate. This provides a substantial reduction in set up time when the printing machinery is being converted from recto to verso printing or when the size of the paper being printed upon is changed. The coupling is particularly suited for use as a coupling between two support portions of a sheet transfer drum wherein the two support portions are adjustable circumferentially with respect to each other. When the sheet transfer drum is used in a sheet fed rotary printing machine capable of being converted to recto and verso printing the first support portion of the sheet transfer drum may be provided with controllable grippers that are used for gripping the leading edges of sheets. The second support portions of the sheet transfer drum are provided with controllable holding arrangements such as vacuum holder bars which grip the trailing portions of successive sheets.

BRIEF DESCRIPTION OF THE DRAWINGS

While the novel feature of the coupling for a sheet fed rotary printing machine in accordance with the present invention are set forth with particularity in the appended claims, a full and complete understanding of the invention may be had by referring to the detailed description of a preferred embodiment as set forth, subsequently, and as may be seen in the accompanying drawings in which.

DESCRIPTION OF THE PREFERRED EMBODIMENT

Figure 2:
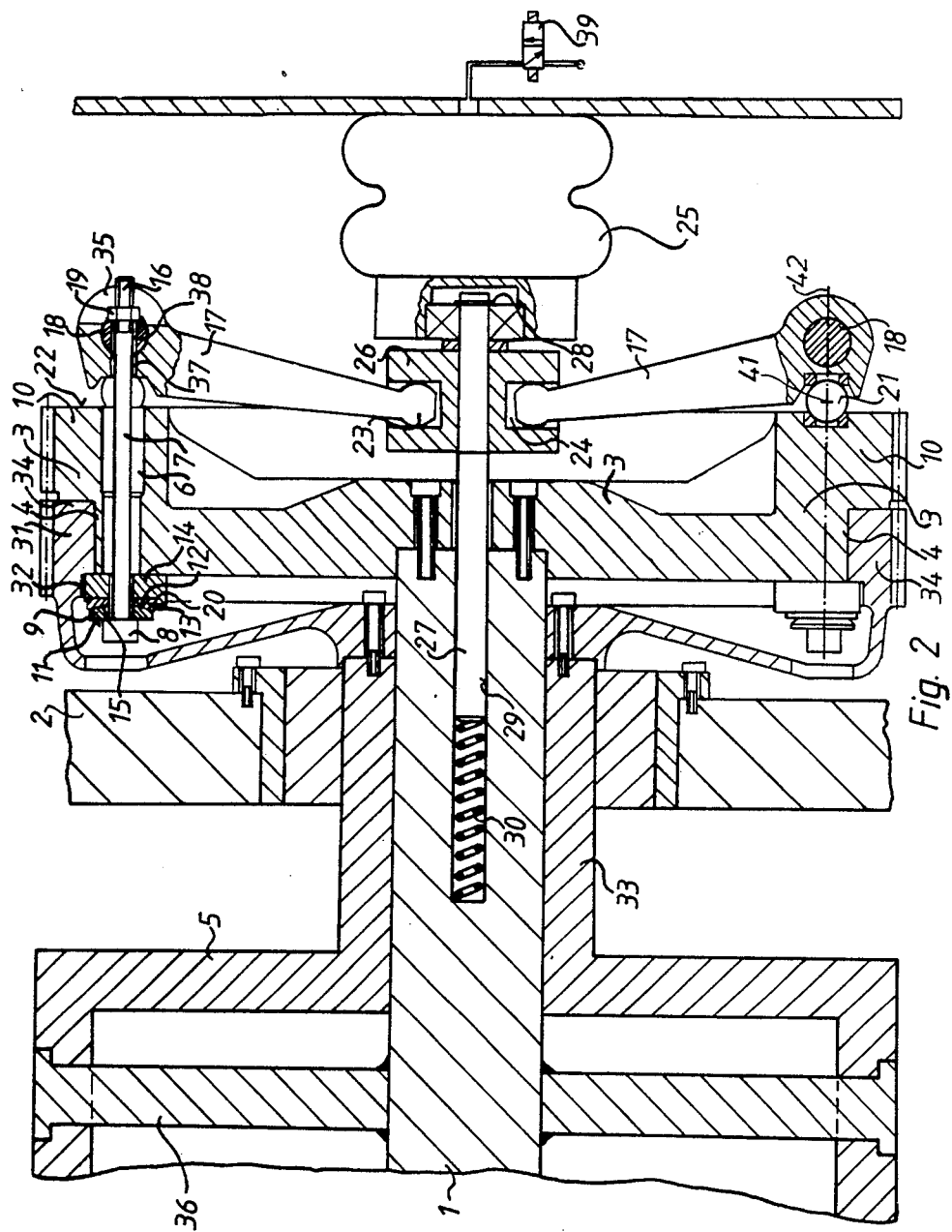
FIG. 2 is a cross-sectional view of the coupling taken along line II—II in FIG. 1.

Turning initially to FIG. 2, there may be seen a sheet transfer body 5 which is supported for rotation by a drive shaft 1 that passes through, and is supported within side frames 2 of a sheet fed rotary printing machine. A first, toothed cylinder wheel 3 is secured to a free end of drive shaft 1 by suitable screw or other appropriate means, as may be seen in FIG. 2. This toothed cylinder wheel 3 includes an outer toothed ring body 10 and a reduced diameter collar or shoulder 4. The shoulder 4 is on the side of toothed cylinder wheel 3 which is closer to side frames 2. A second, hollow toothed wheel 31 is carried on shoulder 4 of cylinder wheel 3. Both cylinder wheel 3 and hollow wheel 31 have similar gear teeth formed on their outer peripheral surfaces. As may also be seen in FIG. 2, hollow wheel 31 includes a hollow toothed wheel body portion 34 which has a thickness selected such that when hollow wheel body 34 is positioned on shoulder 4 of cylinder wheel 3, the outer peripheral surfaces of the two wheels will be aligned. A reduced thickness web portion of hollow toothed wheel extends rearwardly and radially inwardly. The radial inner portion of the web is positively secured by screws or similar means to a free end of a hollow journal 33. This hollow journal 33 is concentric with drive shaft 1 which passes through the hollow central aperture formed in hollow journal 33. Hollow journal 33 itself is supported by suitable bearings or the like in side frames 2 of the printing machine.

A plurality of boreholes 6 are formed in the toothed ring body portion 10 of cylinder wheel 3. These boreholes 6 are all in the same radius which is less than that of reduced diameter collar or shoulder 4. These boreholes are evenly circumferentially distributed and have their axes parallel to the rotational axis of toothed cylinder wheel 3. Each borehole has a smooth shafted cylinder screw 7 passing therethrough. A head portion 8 of each cylinder screw is located between the web portion of hollow toothed wheel 31 and the body of cylinder wheel 3. A first washer 9 has a flat surface portion 11 which is in contact with head 8 of cylinder screw 7. The opposed surface of first washer 9 is formed as a generally convex surface 12. Convex surface 12 mates or cooperates with a concave surface 15 of a second washer 13. Thus washers 9 and 13 essentially form a shiftable bearing surface for head 8 of cylinder screw 7. Washer or disk 13 has a second, opposed flat surface which is received in a recess 20 formed on a surface of a generally disk shaped tensioning support lug 14. Tensioning support lug 14, in turn, areas against an inner surface of toothed cylinder wheel 3 and has a circumference sufficiently large to overlie the inner terminus of a corresponding borehole 6. A peripheral portion of each tensioning support lug 14 is also received in an annular inner recess or collar 32 formed on the inner periphery of the body of the second hollow toothed wheel 31. Thus a tensioning force exerted against the head 8 of the plurality of cylinder screws 7 is transmitted through the first and second washers 9 and 13 and through the tensioning support lugs 14 which bear against the coplanar end faces of the reduced diameter shoulder 4 of toothed cylinder wheel 3 and the surface of inner annular areas 32 of the second hollow toothed wheel 31. These two wheels are thereby held together by a friction fit so that they are effectively locked together so long as tension is applied to head 8 of each cylinder screw 7.

Each cylinder screw 7 extends completely through its respective enlarged borehole 6 and, as may be seen in FIG. 2 terminates in a threaded end 16. This threaded end 16 passes through an aperture in a transverse pivot support bolt 18. As may be seen in both FIGS. 1 and 2, each such transverse pivotable support bolt 18 is carried in a suitable through bore in an upper portion 35 of an actuating lever 17. A nut 19 is used to secure the threaded end 16 of each cylinder screw 7 against its cooperating support bolt 18.

Figure 1:
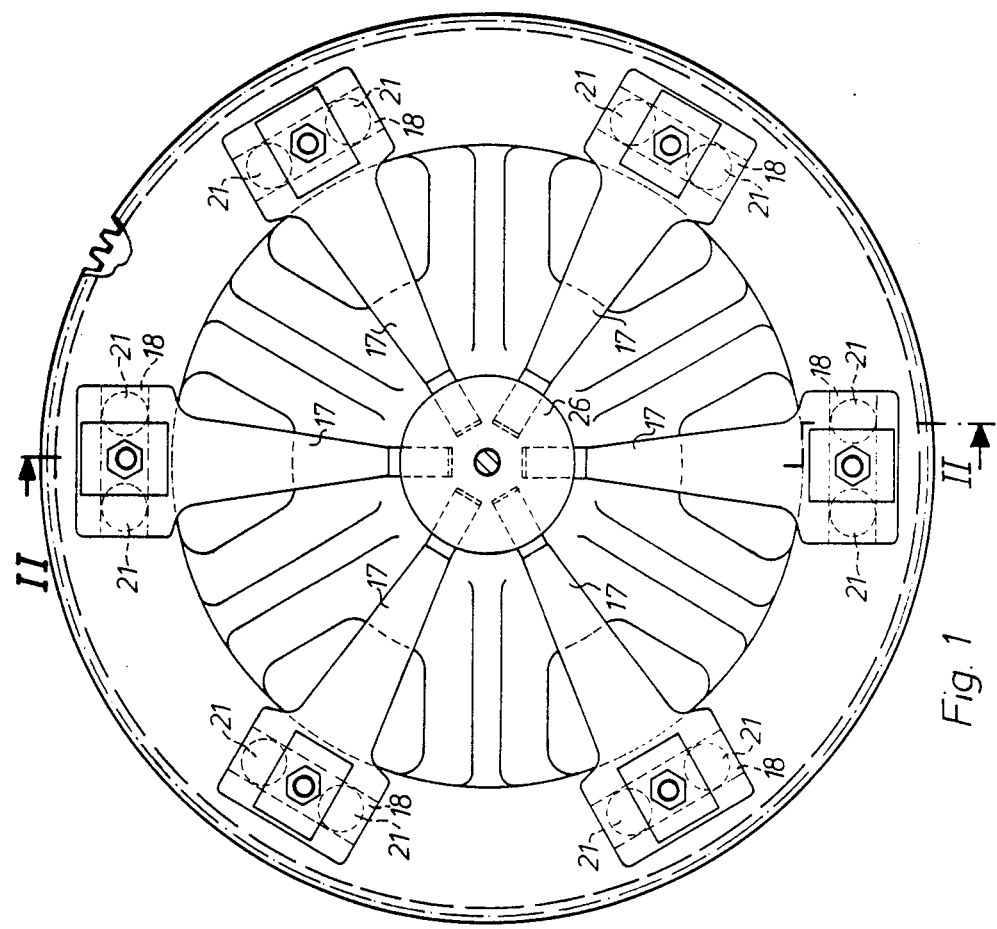
FIG. 1 is a front view of the coupling in accordance with the present invention.

The upper or radially outer portions 35 of the actuating levers 17 are pivotably supported by spaced balls 21 which bear against an outer flank 22 of outer toothed ring body portion 10 of cylinder wheel 3. As may be seen most clearly in FIG. 1, these support balls 21 are spaced on either side of cylinder screw 7 and are, as seen in FIG. 1, directly behind or beneath transverse pivot support bolt 18. These balls act as a pivot point 41 for the actuating levers 17 which are caused to move in a manner as will now be described.

Actuating levers 17 are formed having ball shaped lower, radially inner ends 23. These inner ends are articulatedly carried in pocket hole bores 24 formed in a cylindrical guide body 26. This guide body 26 is securely attached to a piston rod 27 of a fix-framed, simply operating pneumatic cylinder 25, which, as may be seen in FIG. 2, is preferably of the bellows type. The piston rod 27 is pivotably attached to the pneumatic cylinder by means of a retaining ring 28. Piston rod 27 is axially slidable in a central bore 29 formed in the drive shaft 1 for the sheet transfer drum. Movement of the piston rod 27 axially inwardly into drive shaft 1, or to the left as seen in FIG. 2, is opposed by a helical compression spring 30. A suitable control valve 39 is provided and is used to supply a high pressure fluid to the interior of pneumatic cylinder 25, and to release this fluid, as desired.

As is generally known in the art, the periphery of a sheet transfer drum, such as the one shown generally at 5, includes a plurality of sheet transport assemblies. These typically may take the form of sheet grippers which grasp a leading edge of a sheet, and holding bars which are often vacuum actuated and which may engage a sheet trailing edge. In the present device, although not specifically shown, it will be understood that the fixed peripheral portions of sheet transfer drum; i.e. those parts connected to sheet transfer body 5 and to hollow journal 33, carry the sheet leading edge grippers, and that the sheet trailing edge holding bars are carried on movable support segments 36 which are attached to drive shaft 1. Thus by relative movement of drive shaft 1 with respect to hollow journal 33, the relative positions of the various sheet transport segments can be varied as would be required when changing the printing couples, with which sheet transfer drum 5 cooperates, from recto to verso printing or when changing paper sheet sizes.

Relative rotation of drive shaft 1 and hollow journal 33 is accomplishable through the use of the coupling assembly which has been disclosed above. To detach the second, hollow toothed wheel 31 from the first toothed cylinder wheel 3, it is necessary to actuate pneumatic cylinder 25 through valve 39. This causes piston rod 27 to slide axially into bore 29 in drive shaft 1, against the force of spring 30 which is compressed. As piston rod 27 moves to the left, it carries with it cylindrical guide body 26. Thus the lower ball shaped ends 23 of angled or bent actuating levers 17 are also moved to the left. These levers 17 pivot about their pivot points 41 on balls 21. The effect of this motion is to cause the cylinder screws 7 to move slightly downwardly at their connections to pivotable support bolts 18. As the boreholes 6 through which the cylinder screws 7 pass are substantially larger than the cylinder screws 7, and further since the downward movement of the threaded ends 16 of the cylinder screws 7 causes a slight movement of screw heads 8 axially to the left, as viewed in FIG. 2, such movement being allowed by the pivotable convex and concave interfaces 12 and 15 of first and second washers 9 and 13, respectively, the force exerted on tensioning support lug 14 by cylinder screws 7 is relaxed. This allows relative movement to be made between the first toothed cylinder wheel 3 and the second hollow toothed wheel 31. Since cylinder wheel 3 is secured to drive shaft 1 which carries holding bar support segments 36, and since hollow toothed wheel 31 is secured to hollow journal 33 of sheet transfer drum body 5, the relaxation of the friction fit connection between wheels 3 and 31 by the application of fluid to pneumatic cylinder 25 allows relative rotation of the toothed wheels of the coupling and hence of the components of the sheet transfer drum.

Toothed cylinder wheel 3 and hollow cylinder wheel 31 may be locked together by removal of the pressure from pneumatic cylinder 25. Piston rod 27 is thus forced to the right by compression spring 30 and thus actuating levers 17 pivot about their pivot points 41 so that the tensioning support lugs 14 are pulled by the cylinder screws 7 against the surfaces of annular recess 32 of hollow toothed wheel 31 and the shoulder 4 of cylinder wheel 3. These wheels are then connected by a friction fit which is maintained since actuating levers 17 move beyond a dead center position. In this position, the pivot point 41 of each actuating lever 17 lies on a line of influence 42 of a clamping force.

As was previously discussed, the cylinder toothed wheel 3 and the hollow toothed wheel 31 of the coupling assembly of the present invention lie in a one toothed wheel train between two printing couples of the sheet fed rotary printing machine. If the friction fit interconnection between the two wheels 3 and 31 is released in the manner disclosed above, one printing couple may be locked and the second printing couple may be driven by suitable drive means such as an electric motor. Movement of the second printing couple through a pre-selected angle will cause the sheet leading edge gripper arrangement to follow the movement of the hollow toothed wheel 31 and thus the second printing couple while movement of the sheet trailing edge holding bar support segment will follow the movement of the cylinder toothed wheel 3 and hence of the first printing couple.

While a preferred embodiment of a coupling in a sheet fed rotary printing machine in accordance with the present invention has been fully and completely set forth hereinabove, it will be apparent to one of ordinary skill in the art that a number of changes in, for example the number of drive teeth, the number of cylinder bolts and actuating levers, the type of pneumatic cylinder, the size of the sheet transfer drum and the like can be made without departing from the true spirit and scope of the present invention which is accordingly to be limited only by the following claims.

What is claimed is:

1. A coupling for a sheet fed rotary printing machine for recto and verso printing and having first and second printing couples, one of the printing couples being capable of being held fixed and the other printing couple being drivable when said coupling is held open, said coupling comprising:

a first toothed cylinder wheel and a second toothed hollow wheel, said first and second wheels being frictionally releasably engaged coaxially to each other and being clampable together by a clamping force exerted by said coupling, each of said toothed wheels serving to drive one of the printing couples;

at least a first radially extending, angled actuating lever supported at a first end at a pivot point on a flank of said first cylinder wheel, said lever exerting said clamping force on said first and second toothed wheels;

remotely controllable drive means to move a second end of said lever to pivot said first end of said lever about said pivot point to overcome said clamping force and to remove said clamping force from said coupling; and means to continually apply said clamping force and to close said coupling upon deactiviation of said drive means, said pivot point of said lever lying directly on a line of influence of said clamping force exerted during coupling closing, said line of influence being parallel to axes of said coaxially engaged first and second toothed wheels.

2. A coupling for a sheet fed rotary printing machine for recto and verso printing, said printing machine including first and second printing couples one of which may be held fixed while the other is being driven when said coupling is held open, said coupling comprising:

a first toothed cylinder wheel and a second toothed hollow wheel, said first and second toothed wheels being frictionally detachably engaged coaxially to each other by a clamping force exerted by said coupling, each of said toothed wheels serving to drive one the printing couples, said second toothed hollow wheel being coaxially supported on a shoulder formed on said first toothed cylinder wheel;

a plurality of radially extending angled actuating levers, first ends of said actuating levers having ball-shaped ends articulatedly carried in a guide body secured to a piston rod of a pneumatic cylinder, second ends of said actuating levers being pivotably supported on a flank of said first toothed wheel, a plurality of cylinder screws, each of said cylinder screws having a head contacting a tensioning support lug in contact with said first and second toothed wheels and a threaded end secured to said second end of one of said actuating levers; and a sheet transfer drum having a central drive shaft, said drive shaft including an axial bore which slidably receives said piston rod, a compression spring being carried on said borehole and contacting a free end of said piston rod.

* * * * *